United States Patent [19]

Schallus et al.

[11] 4,061,719

[45] Dec. 6, 1977

[54] PROCESS OF CONDUCTIVE CARBON BLACK FOR USE IN DEPOLARIZATION MASSES IN DRY BATTERIES

[75] Inventors: Erich Schallus, Cologne; Gerhard Mietens, Hurth; Gregor Fucker, Erftstadt-Liblar; Jürgen Petrell, Weilerswist; Friedrich Wilhelm Dorn, Hurth-Hermulheim, all of Germany

[73] Assignee: Hoechst Aktiengesellschaft, Frankfurt am Main, Germany

[21] Appl. No.: 674,575

[22] Filed: Apr. 7, 1976

[30] Foreign Application Priority Data

Apr. 10, 1975 Germany .............................. 2515633

[51] Int. Cl.$^2$ ...................... C01B 31/00; C01B 31/02; C09C 1/48
[52] U.S. Cl. .................................. 423/445; 423/449; 423/460; 429/232
[58] Field of Search ............... 423/445, 460, 461, 448, 423/449; 429/232

[56] References Cited

U.S. PATENT DOCUMENTS

| 3,401,020 | 9/1968 | Kester et al. | 423/450 |
|---|---|---|---|
| 3,832,450 | 8/1974 | Wiggins | 423/450 |

FOREIGN PATENT DOCUMENTS

| 72,088 | 5/1970 | Germany | 423/460 |

*Primary Examiner*—O. R. Vertiz
*Assistant Examiner*—Gregory A. Heller
*Attorney, Agent, or Firm*—Connolly and Hutz

[57] ABSTRACT

Conductive carbon black for use in depolarization masses in dry batteries is produced. To this end, an aqueous suspension of carbon black having, an AS-number higher than 15 and having been obtained by subjecting hydrocarbons, which are liquid at room temperature, to thermal conversion at 1200°–2000° C, under 1–80 atmospheres, and in the presence of oxygen or oxygen-containing gas and, if desired, steam, and water-scrubbing the resulting carbon black-containing reaction gas, is intimately mixed at 5°–120° C, under 1–20 atmospheres, in liquid phase and for 1–20 minutes with 0.5–10 g, per gram of carbon black, of vaporizable aliphatic or cycloaliphatic hydrocarbons, the resulting carbon black is separated from the liquid phase, heated and thereby freed from hydrocarbons and water, and the temperature is finally increased for 2–30 minutes to 1100°–2200° C.

8 Claims, No Drawings

PROCESS OF CONDUCTIVE CARBON BLACK FOR USE IN DEPOLARIZATION MASSES IN DRY BATTERIES

The present invention relates to a process for making conductive carbon black for use in depolarization masses of dry batteries. To be useful for this, carbon black has to have certain properties which make it possible for it to be used in dry batteries and favorably influence the discharge of the latter. Such properties comprise, for example, the electric conductivity and the power for absorbing moisture which is empirically determined by the absorption number (AS-number; absorption stiffness). The AS-number indicates that quantity of a water/acetone-mixture (mixing ratio = 9:1) in $cm^3$ which is necessary to convert 5 g of carbon black into a single ball, in a round flask. Carbon black having an AS-number lower than 15 does not comply with the requirement standards set by battery producers.

The individual properties of carbon black have not yet been fully determined quantitatively as to their influence on the functioning of a battery, so that it is necessary for any carbon black to be subjected to a battery test so as to conclusively determine its qualification for use therein. The invention accordingly provides for the present carbon black to be tested in dry batteries designed and discharged in accordance with IEC standards (International Electrochemical Commission) and for the test results to be evaluated.

It has already been disclosed that carbon black, which is produced by decomposing acetylene at temperatures higher than 2300° C, is suitable for use in depolarization masses. Needless to say carbon black based on acetylene, which is made by a process requiring the expenditure of considerable energy, is very expensive. Commercially available is carbon black having an AS-number of 15 up to 35. Carbon black with a high AS-number has a relatively low apparent density of about 60 g/l. As a result, transportation especially over long distances, is very expensive. In addition to this, the structure of acetylene-based carbon black, which critically determines the carbon black's AS-number, has been found to be degradable under relatively low mechanical stress. As a result, unpressable depolarization masses are obtained, or disproportionate quantities of carbon black have to be used. Acetylene-based carbon black has a specific electric resistance of 2-3 . $10^{-2}$ ohm . cm under a contact pressure of 1500 atmospheres.

We have now unexpectedly found that carbon black, which is produced at temperatures considerably lower than 2300° C in an oxygen-containing atmosphere and subjected to an appropriate after-treatment also at temperatures considerably lower than 2300° C, has properties equating those of acetylene-based carbon black, in respect of the specific electric resistance and qualification for use in depolarization masses.

The starting material used in the process of the present invention for making conductive carbon for depolarization masses in dry batteries is carbon black, which is obtained by subjecting liquid, preferably high-boiling hydrocarbons, such as residues, e.g., heavy fuel oil, originating from the distillation of petroleum, to a thermal conversion reaction at temperatures of 1200° C up to 2000° C in the presence of oxygen or one or more oxygen-containing gases and, if desired, steam. The carbon black is generally obtained by water-scrubbing the carbon black-containing reaction gas with the resultant formation of an aqueous suspension containing 5 up to 40 g of carbon black per liter. The carbon black so obtained has an AS-number higher than 15.

While the carbon black so made is actually less expensive, especially in those cases in which the CO and $H_2$ mixture obtained is utilized, than acetylene-based carbon black it does not satisfy the requirements set by the IEC battery test (cf., battery test in Example 1). The invention therefore provides for the above carbon black suspension to be treated, in a first step, at a preferred pH of 7 up to 10 with one or more vaporizable, saturated, aliphatic or cycloaliphatic hydrocarbons, which are used in proportions of 0.5 up to 10 g per gram of carbon black. The above pH values are preferred inasmuch as they enable the incomplete separation of non-freely flowable carbon black to be avoided, which has been found to occur in the acid range, e.g., at pH 3. The treatment with the above hydrocarbons is effected at 5° - 120° C. In those cases in which the temperature selected is higher than the boiling point of water or the particular hydrocarbon used, it is good practice for the treatment to be carried out under the pressure necessary to maintain the liquid phase. During that treatment carbon black and hydrocarbons commence separation from the bulk of water. Aromatic hydrocarbons can scarcely be used to effect the separation of carbon black. Benzene, for example, effects the formation of a pasty mass difficult to process. In addition to this, the separation of carbon black is incomplete.

The suspension obtained is agitated for a period of 1 up to 20 minutes, depending on the efficiency of the agitator used, and carbon black is separated as "dry material" containing 20-30 weight % of carbon, the balance being hydrocarbons and water. In carrying out the present process, it has been found advantageous to use hydrocarbons boiling between 25° and 100° C, especially in those cases in which it is desirable to recover the hydrocarbons and to avoid reactions of the latter on the carbon black's surface during recovery.

The invention also provides for the carbon black so separated to be subjected, in a second step, to thermal treatment at the temperatures necessary to vaporize the hydrocarbon and water, which are recovered, and for the temperatures to be then increased to 1100° up to 2200° C.

The compressibility of a depolarization mass for use in dry batteries is a function of the carbon black's power for absorbing moisture (AS-number) and the wet mixing period. The term "wet mixing period" as used herein means the time which is needed to mix a dry blend, e.g., of manganese dioxide, ammonium chloride, zinc oxide and carbon black, with the internal electrolyte being an aqueous zinc chloride solution, for example. Inasmuch as the carbon black of the present invention is concerned, it is not possible for conclusions as to its behavior in a depolarization mass to be drawn from the AS-number. In other words, the carbon black of the present invention and commercially available acetylene-based carbon black of comparable AS-numbers have been found to behave differently in depolarization masses.

The following tests were made to illustrate the differences in behavior of various grades of carbon black. Commercially available acetylene-based carbon black with an AS-number of 32 was ground for 15 minutes in a ball mill. After that treatment, the AS-number was 16. In a control test, carbon black of the present invention was ground under analogous conditions. Its initial AS-number of 23 remained unchanged.

The following statements further illustrate these facts.

Carbon black which is used in dry batteries has a mean particle size of 25 to 60 microns. As can be seen under an electron microscope, these primary particles join together to chains which are more or less coiled. While it is possible for the various grades of carbon black to be subdivided into low- or high-structured carbon black on the evidence of their respective degree of coiling, the fact remains that it has not been possible heretofore to even approximately quantitatively identify their structure or degree of coiling.

The AS-number is a value which enables the occupation of an empty space by a liquid without mechanical stress to be empirically determined. To be suitable for use in depolarization masses, it is, however, an important requirement for the carbon black to have a certain structural strength, which makes it possible for the coils to withstand mechanical stress, especially contact pressure.

One possibility of determining the behavior of carbon black in a depolarization mass under conditions approaching those used in practice comprises identifying the free moisture. To this end, 4 g of a depolarization mass consisting of 70 parts by weight of electrolytic manganese dioxide, 17 parts by weight of NH$_4$Cl, 1 part by weight of ZnO, 12 parts by weight of carbon black, and 24 parts by weight of a 20 wgt % solution of ZnCl$_2$, is applied under a constant weight of 8 kg on to absorbent paper having a surface of 5.4 m$^2$/g and being placed on a zinc plate.

Weight and zinc plate, respectively, are the anode and cathode. Under the contact pressure, the structure of the moisture-containing carbon black is more or less changed and moisture is set free. The quantity of moisture set free under the contact pressure or "free moisture" decreases the carbon black's strength increases. Depending on the quantity of free moisture the absorbent paper is more or less moist and a consistent current intensity is produced on applying voltage thereto. The maximum drop of potential in millivolt found to occur across a fixed resistor of 10 ohm is the factor determining the free moisture.

The following Table 1 shows the correlation existing between the free moisture and the wet mixing period. Compared in Table 1 is carbon black made in accordance with this invention with commercially available acetylene-based carbon black with comparable AS-number. The Table clearly indicates that the present carbon black shows a behavior different from that of acetylene-based carbon black.

Table 1:

| carbon black | AS-number (ml/5g) | Free-moisture in nV Wet-mixing period | |
|---|---|---|---|
| | | 8 min | 14 min |
| Acetylene-based, highly compressed | 20 | 1 030 | 1 050 |
| Acetylene-based, compressed | 22 | 1 005 | 1 020 |
| Example 3 | 21.5 | 425 | 420 |
| Example 4 | 20 | 500 | 505 |
| Example 5 | 22 | 495 | 495 |

The present invention relates more particularly to a process for making conductive carbon black for use in depolarization masses in dry batteries, which comprises intimately mixing at temperatures of 5° up to 120° C, under pressures of 1 up to 20 atmospheres, in liquid phase, and for a period of 1 up to 20 minutes, an aqueous suspension of carbon black having an AS-number higher than 15 with 0.5 up to 10 g, per gram of carbon black, of one or more vaporizable aliphatic or cycloaliphatic hydrocarbons, separating the resulting carbon black from the liquid phase, heating and thereby freeing the carbon black from hydrocarbons and water, and then increasing the temperatures over a period of 2 up to 30 minutes to 1100° up to 2200° C, the said suspension being obtained by subjecting hydrocarbons, which are liquid at room temperature, to thermal conversion at temperatures of 1200° up to 2000° C, under pressure of 1 up to 80 atmospheres, and in the presence of oxygen or one or more oxygen-containing gases and, if desired, steam, and water-scrubbing the resulting carbon black-containing reaction gas.

Further preferred features of the present invention provide:

a. for the aqueous suspension to contain between 5 and 40 g of carbon black per liter;

b. for the aqueous carbon black suspension to be intimately mixed with the hydrocarbons at a pH of 7 up to 10;

c. for the hydrocarbons to have a boiling range of 25° up to 100° C;

d. for the carbon black to be freed from the hydrocarbons and water by heating to 200° C;

e. for the carbon black so freed from the hydrocarbons and water to be heated for a period of 5 up to 15 minutes in the presence of nitrogen, hydrogen or carbon monoxide to temperatures of 1400° up to 1800° C; and f. for the carbon black freed from hydrocarbons and water to be heated to temperatures higher than 1200° C in the presence of chlorine, hydrogen chloride or one or more halogen-yielding compounds.

The halogen-yielding compounds, which may be substituted for chlorine or hydrogen chloride for reasons of safety, preferably comprise, e.g., carbon tetrachloride, vinyl chloride and dichlorodifluoromethane.

The invention also relates to conductive carbon black for use in depolarization masses in dry batteries, the conductive carbon black being characterized in that it contains at least 97 weight % of carbon, has an absorption number (AS-number) of 15 up to 35, a specific electric resistance of $10^{-1}$ up to $10^{-3}$ ohm . cm under a contact pressure of 1500 atmospheres, an apparent density of 100–180 g/l, a BET-surface area of 100–1000 m$^2$/g, and a free moisture content, determined in a depolarizer test mixture in millivolt, equal to 35 up to 55% of the free moisture of compressed acetylene-based carbon black having an identical AS-number, the test mixture consisting of 70 parts by weight of manganese dioxide, 17 parts by weight of ammonium chloride, 1 part weight of zinc oxide, 24 parts by weight of a 20% aqueous zinc chloride solution as internal electrolyte, and 12 weight % of the carbon black to be tested, and further characterized in that it has been prepared by a process wherein an aqueous suspension of carbon black having an AS-number higher than 15, which is obtained by subjecting hydrocarbons which are liquid at room temperature to a thermal conversion reaction at temperatures of 1200° up to 2000° C, under pressures of 1 up to 80 atmospheres, and in the presence of oxygen or one or more oxygen-containing gases and, if desired, steam, and by water-scrubbing the resulting carbon black-containing reaction gas, is intimately mixed at temperatures of 5° up to 120° C, under pressures of 1 up to 20 atmospheres, in liquid phase, and for a period of 1 up to 20 minutes, with one or more vaporizable aliphatic or cycloaliphatic hydrocarbons, the resulting carbon black is separated from the liquid phase, heated and thereby freed from hydrocarbons and water, and the temperature is finally increased over a period of 2 up to 30 minutes to 1100° up to 2200° C.

In the above test mixture, the free moisture is preferably within the range 370 and 570 millivolt.

The following Examples illustrate the preparation of conductive carbon for use in depolarization masses in dry batteries.

The starting material used therein was carbon black, which was obtained in the form of an aqueous suspension containing 15 g of carbon black per liter by subjecting heavy fuel oil to thermal conversion with oxygen and steam at 1400° C and under a pressure of 50 atmospheres, and water-scrubbing the resulting carbon black-containing reaction gas.

EXAMPLE 1: (Comparative Example)

The aqueous carbon black suspension was evaporated and the following characteristic data were determined:
AS-number: 28
Specific electric resistance: $2.5 \cdot 10^{-2}$ ohm . cm
Apparent density: 102 g/l
BET-surface: 600 m²/g
Carbon content: 97.5 weight %
Battery test: see Table 2

EXAMPLE 2: (Comparative Example)

200 l of the aqueous carbon black suspension was placed in an agitator-provided vessel, 6 kg of gasoline (boiling range: 30°-90° C) was added, the whole was agitated for 10 minutes and carbon black was separated at pH 9, at 25° C and under a pressure of 1.2 atmospheres absolute. 20 weight % of the resulting material was carbon black, 40 weight % was gasoline and 40 weight % was water. The material was heated to 200° C while the gasoline was recovered. 3 kg of a water and gasoline free product was obtained. It was heated for 60 minutes to 1000° C under nitrogen.

The carbon black had the following characteristic properties:
AS-number: 26
Specific electric resistance: $2.4 \cdot 10^{-2}$ ohm . cm
Apparent density: 102 g/l
BET-surface: 630 m²/g
Carbon content: 98 weight %
Battery test: see Table 2.

EXAMPLE 3

The procedure was the same as that described in Example 2, but the dry, water and gasoline-free carbon black was heated for 20 minutes to 1500° C under nitrogen.

The carbon black had the following characteristic properties:
AS-number: 21.5
Specific electric resistance: $2.5 \cdot 10^{-2}$ ohm . cm
Apparent density: 120 g/l
BET-surface: 250 m²/g
Carbon content: 98.6 weight %
Free moisture (wet mixing period: 8 min.): 425 millivolt
Battery test: see Table 2.

EXAMPLE 4

The procedure was the same as that described in Example 2, but the dry, water and gasoline-free carbon black was treated for 20 minutes with hydrogen chloride at 1800° C.

The carbon black had the following characteristic properties:
AS-number: 20
Specific electric resis-tance: $4.1 \cdot 10^{-2}$ ohm . cm
Apparent density: 160 g/l
BET-surface: 160 m²/g
Carbon content: 99.5 weight %
Free moisture (wet mixing period: 8 min.): 500 millivolt
Battery test: see Table 2.

The same result was obtained in an experiment in which the hydrogen chloride was replaced by nitrogen admixed with 5% by volume of dichlorodifluoromethane.

EXAMPLE 5

200 l/h of carbon black suspension and 9 l/h (= 6 kg/h) of gasoline (boiling range: 30°-90° C; aromatic content less than 1 weight %) were continuously pumped into the bottom portion of an agitator-provided reactor and the whole was agitated to provide for an intimate contact between the carbon black suspension and the hydrocarbon. The whole was allowed to remain in the reactor over a period of 15 minutes, at a pH of 9.1, a temperature of 30° C and under a pressure of 1.1 atmosphere. Water and carbon black were removed jointly from the upper portion of the reactor and delivered to a separating vessel. Slightly turbid water free from carbon black and "dry" bulk material containing 25 weight % of carbon black, 50 weight % of gasoline and 25 weight % of water was obtained therein. The material was delivered via an intermediary container provided with a dosing means to an externally heated rotary kiln, in which gasoline and water were evaporated at 200° C, and condensed in a cooling system placed downstream of the kiln. The dry carbon black was delivered to a furnace heated by means of an electric resistance heater and heated to 1800° C therein. 3 kg/h of carbon black was removed via a cooled discharge means.

The carbon black had the following characteristic properties:
AS-number: 22
Specific electric resistance: $2.5 \cdot 10^{-2}$ ohm . cm
Apparent density: 135 g/l
BET-surface: 170 m²/g
Carbon content: 98.5 weight %
Free moisture: 495 millivolt
Battery test: see Table 2.

The carbon black was subjected to the battery test in "paperlined" zinc/manganese dioxide cells R 20 (IEC). The depolarization mass (cathode mass) consisted of 70 parts by weight of manganese dioxide, 18 parts by weight of ammonium chloride, 1 part by weight of zinc oxide, 12 parts by weight of the carbon black grades prepared in the manner described in Examples 1 to 5, and 27 parts by weight of an internal electrolyte, which was a 23.5 weight % aqueous zinc chloride solution containing 0.2 weight % of $HgCl_2$.

6 cells were stored in each particular case for 5 days at 20° C (n), or for 5 days and a further 30 days at 45° C (T) and then discharged under the following conditions:

a. lighting discharge: 30 min/day across 5 ohm up to 0.75 volt b. transistor discharge: 4 h/day across 40 ohm up to 0.9 volt c. tape recorder discharge: 2 h/day across 5 ohm up to 1.1 volt.

Many of the batteries made with the carbon black of Example 1 and stored under tropical conditions (45° C) were found to undergo inflation and become inoperable. The following Table 2 shows that it was necessary to use the carbon black of the present invention to obtain results comparable to those produced by acetylene-based carbon black.

Table 2

| Carbon black of Ex. | Discharge of R 20 - cells | | | |
|---|---|---|---|---|
| | Storage | Lighting discharge in hours | Transistor discharge in hours | Tape recorder discharge in hours |
| 1 | n | 13.83 | 163.75 | 9.89 |
| | T | 14.00 | 139.00 | 6.92 |
| 2 | n | 13.50 | 182.00 | 9.89 |
| | T | 13.45 | 136.00 | 7.50 |
| 3 | n | 13.92 | 204.00 | 11.72 |
| | T | 12.33 | 144.00 | 10.00 |
| 4 | n | 18.00 | 200.00 | 10.00 |
| | T | 15.50 | 179.60 | 9.67 |
| 5 | n | 17.00 | 204.00 | 12.00 |
| | T | 9.75 | 148.00 | 9.75 |
| Acetylene-based carbon black | n | 21.00 | 211.50 | 10.00 |
| | T | 17.00 | 187.83 | 9.18 |

We claim:

1. A process for making conductive carbon black for use in depolarization masses in dry batteries, which comprises intimately mixing an aqueous suspension of carbon black having an AS-number higher than 15 and having been obtained by subjecting hydrocarbons, which are liquid at room temperature, to thermal conversion at temperatures of 1200° up to 2000° C, under pressures of 1 up to 80 atmospheres, and in the presence of oxygen or oxygen-containing gases, and water-scrubbing the resulting carbon black-containing reaction gas, with 0.5 up to 10 g, per gram of carbon black, of vaporizable aliphatic or cycloaliphatic hydrocarbons having a boiling range of 25° up to 100° C, the mixing operation being effected at temperatures of 5° up to 120° C, under pressures of 1 up to 20 atmospheres, in liquid phase, and for a period of 1 up to 20 minutes, separating the resulting carbon black from the liquid phase, heating and thereby freeing the carbon black from hydrocarbons and water, and increasing the temperature over a period of 2 up to 30 minutes to 1100° up to 2200° C.

2. A process as claimed in claim 1, wherein the aqueous suspension contains between 5 and 40 g of carbon black per liter.

3. A process as claimed in claim 1, wherein the aqueous carbon black suspension is intimately mixed with the hydrocarbons at a pH of 7 up to 10.

4. A process as claimed in claim 1, wherein the carbon black is freed from the hydrocarbons and water by heating to 200° C.

5. A process as claimed in claim 1, wherein the carbon black freed from the hydrocarbons and water is heated for a period of 5 up to 15 minutes in the presence of nitrogen, hydrogen or carbon monoxide to temperatures of 1400° up to 1800° C.

6. A process as claimed in claim 1, wherein the carbon black freed from hydrocarbons and water is heated to temperatures higher than 1200° C in the presence of chlorine, hydrogen chloride or halogen-yielding compounds.

7. Conductive carbon black for use in depolarization masses in dry batteries, the conductive carbon black being characterized in that it contains at least 97 weight % of carbon, has an absorption number (AS-number) of 15 up to 35, a specific electric resistance of $10^{-1}$ up to $10^{-3}$ ohm cm under a contact pressure of 1500 atmospheres, an apparent density of 100–180 g/l, a BET-surface area of 100–1000 m²/g, and a free moisture content, determined in a depolarizer test mixture in millivolt, equal to 35 up to 55% of the free moisture of compressed acetylene-based carbon black having an identical AS-number, the test mixture consisting of 70 parts by weight of manganese dioxide, 17 parts by weight of ammonium chloride, 1 part by weight of zinc oxide, 24 parts by weight of a 20% aqueous zinc chloride solution as internal electrolyte, and 12 weight % of the carbon black to be tested, the said conductive carbon having been produced by a process as claimed in claim 1.

8. Conductive carbon black as claimed in claim 1 characterized by a free moisture content of 370–570 millivolt.

* * * * *